United States Patent [19]

Ish et al.

[11] Patent Number: 5,778,430
[45] Date of Patent: Jul. 7, 1998

[54] METHOD AND APPARATUS FOR COMPUTER DISK CACHE MANAGEMENT

[75] Inventors: Mark Ish, Shrewsbury; Federico Giovannetti, Ocean, both of N.J.

[73] Assignee: ECCS, Inc., Tinton Falls, N.J.

[21] Appl. No.: 634,886

[22] Filed: Apr. 19, 1996

[51] Int. Cl.$^6$ .................................................. G06F 12/10
[52] U.S. Cl. .............................. 711/133; 711/3; 711/113
[58] Field of Search ........................ 395/821; 398/182; 711/3, 4, 118, 1, 146

[56] References Cited

U.S. PATENT DOCUMENTS

| | | | |
|---|---|---|---|
| 4,835,686 | 5/1989 | Furuya et al. | 364/200 |
| 4,920,478 | 4/1990 | Furuya et al. | 364/200 |
| 5,133,060 | 7/1992 | Weber et al. | 395/425 |
| 5,313,585 | 5/1994 | Jeffries et al. | 395/275 |
| 5,353,425 | 10/1994 | Malamy et al. | 395/425 |
| 5,369,751 | 11/1994 | Kambayashi et al. | 395/425 |
| 5,371,885 | 12/1994 | Letwin | 395/600 |
| 5,418,921 | 5/1995 | Cortney et al. | 395/425 |
| 5,418,929 | 5/1995 | Tsuboi et al. | 395/425 |
| 5,420,999 | 5/1995 | Mundy | 395/425 |
| 5,423,019 | 6/1995 | Lin | 395/425 |
| 5,448,709 | 9/1995 | Chandler et al. | 395/872 |
| 5,452,447 | 9/1995 | Nelson et al. | 395/650 |
| 5,471,602 | 11/1995 | DeLano | 711/118 |
| 5,519,846 | 5/1996 | Swenson | 711/130 |
| 5,526,511 | 6/1996 | Swenson et al. | 711/134 |
| 5,530,958 | 6/1996 | Agrawal et al. | 711/3 |
| 5,638,506 | 6/1997 | Peterson et al. | 395/182.06 |
| 5,659,699 | 8/1997 | Breternitz, Jr. | 711/216 |
| 5,687,390 | 11/1997 | McMillan, Jr. | 395/825 |

OTHER PUBLICATIONS

A. Hospodor, "Hit Ratio of Caching Disk Buffers", COMPCON (Spring 1992) pp. 427–432.

J.T. Robinson et al, "Data Cache Management Using Frequency–Based Replacement", Performance Evaluation Review, vol. 18, No. 1, May 1990, pp. 134–142.

*Primary Examiner*—Christopher B. Shin
*Attorney, Agent, or Firm*—Michaelson & Wallace; Peter L. Michaelson; John C. Pokotylo

[57] ABSTRACT

A computer disk cache management method and apparatus which employs a least-recently-used with aging method to determine a best candidate for replacement as a result of a cache miss. A hash function takes as its input a block number and outputs a hash index into a hash table of pointers. Each pointer in the hash table points to a doubly-linked list of headers, with each header having a bit map wherein the bits contained in the map identify whether a particular block of data is contained within the cache. An ordered binary tree (heap) identifies candidates for replacement such that the best candidate for replacement is located at the root of the heap. After every access to a cache line, the heap is locally reorganized based upon a frequency of use and an age of the cache line, such that the least-frequently-used and/or oldest cache line is at the root of the heap.

10 Claims, 6 Drawing Sheets

METHOD AND APPARATUS FOR COMPUTER DISK CACHE MANAGEMENT

BACKGROUND OF THE INVENTION

1. Field of the Invention

The invention relates generally to the field of computer memory systems, and in particular, to a cache system and method for the management of cached data blocks in a computer disk memory system.

2. Description of the Prior Art

A significant problem faced by the designers of present day computer systems employing modern processors operating at high clock rates is to provide a large amount of memory at reasonable cost while achieving a high system performance. Particularly, modern processors operate at such high clock rates that a memory system oftentimes cannot provide code and/or data at these rates thereby retarding system performance. And while this problem is acute when it involves relatively quick memory, i.e., Dynamic Random Access Memory (DRAM), the problem is further exasperated when it involves slower memory, i.e., disk drives or systems, which are essential in computer systems employing virtual operating systems.

A cost effective, prior art solution to this problem of coupling a computer system to a disk system is to provide a cache memory and is shown in FIG. 1. A cache memory is a relatively small-sized but high-speed memory placed between the computer and the larger-sized but slower disk memory system.

The operating principle of the disk cache memory is the same as that of a central processing unit (CPU) cache. The first time a program or data location is addressed, it must be accessed from the lower-speed disk memory. Subsequent accesses to the same code or data are then done via the faster cache memory, thereby minimizing its access time and enhancing overall system performance. The access time of a magnetic disk unit is normally about 10 to 20 ms, while the access time of the disk cache is about 1 to 3 ms.

Referring now to FIG. 1, a high level block diagram of a prior art disk cache memory system is shown. A computer system having a central processor (CPU) 14, main system memory 10, and host adapter are all interconnected by system bus 24. The host adapter serves as an interface between the computer system and an input/output device, i.e., a disk or array of disks, typically through the use of a standard logical/electrical protocol, i.e., Small Computer System Interface (SCSI).

In this prior art system, the computer system is interfaced via SCSI to a disk array system having one or more magnetic disks organized as an array 22, through an array control unit 24, having array controller 20 and cache memory system 12.

In such a prior art system, the processor issues commands (READ, WRITE, etc.) to the disk array system. For example, in the case of a READ command, if the information requested is immediately in the disk cache 12, the information requested is immediately forwarded to the processor by the array controller over the SCSI bus to the host adapter 16. If the information is not in the cache, the controller 20 retrieves the information from the disk array, loads it into the cache, and forwards it to the processor.

Since all disk cache memory systems are of limited capacity, the disk cache often fills and some of its contents have to be changed as new code/data are accessed from the slower disk memory. A primary objective for a designer of a system utilizing disk cache memory, therefore, is to have the code and data most likely to be needed at a given time available in the disk cache—accesses can then use the fast cache rather than the slower disk memory. When accessing of the cache allows retrieval of necessary data from the disk cache, it is called a "hit", and when retrieval of necessary data cannot be performed, it is called a "miss". The average hit times per times is called a hit ratio.

One of the most important decisions facing the designer of a disk cache system, therefore, is the choice of the disk cache replacement strategy. The replacement strategy determines which disk blocks are removed from the disk cache at a given time thereby making room for newer, additional disk blocks to occupy the limited space within the disk cache. The choice of a replacement strategy must be done carefully, because the wrong choice can lead to poor performance of a disk system, thereby negatively impacting an overall computer system performance.

A number of different methods to manage disk cache replacement has been used in the art, for example, J. T. Robinson and M. V. Devarakonda, "Data Cache Management Using Frequency-Based Replacement", Performance Evaluation Review, Vol. 18, No. 1, May 1990.

Perhaps the simplest replacement strategy employed in the art is the first-in, first-out (FIFO) strategy. This strategy replaces the resident disk block that has spent the longest time in the cache memory. Whenever a block is to be evicted from the disk cache, the oldest block is identified and removed from the cache.

In order to implement the FIFO block-replacement strategy, a cache manager must keep track of a relative order of the loading of the blocks into the disk cache. One prior art method for accomplishing this task is to maintain a FIFO queue of blocks. With such a queue, the "oldest" block is always removed, i.e., the blocks leave the queue in the same order that they entered it.

A serious drawback arises through the use of the FIFO strategy however. By failing to take into account the pattern of usage of a given block, FIFO tends to throw away frequently used blocks because they naturally tend to stay longer in the disk cache. Although relatively easy to implement, FIFO is not a first choice replacement strategy for disk cache designers.

As suggested by its name, the least-recently-used (LRU) replacement strategy replaces a least-recently-used resident block. Generally speaking, the LRU strategy performs better than FIFO. The reason is that LRU takes into account the patterns of program behavior by assuming that the block used in the most distant past is least likely to be referenced in the near future. When employed as a disk cache replacement strategy, the LRU strategy does not result in the replacement of a block immediately before the block is referenced again, which can be a common occurrence in systems employing the FIFO strategy.

Unfortunately, implementation of the LRU strategy may impose much more overhead on the disk cache system than can be reasonably handled by software alone. One possible implementation is to record the usage of blocks by means of a structure similar to a stack. Whenever a resident block is referenced, it is retrieved from the stack and placed at its top. Conversely, whenever a block eviction is in order, the block at the bottom of the stack is removed from the disk cache. A similar effect may be achieved by putting the blocks into a circular list and including a "recently used" bit for each block. The latter is set whenever the block is accessed. When it is time to remove a block, a pointer moves along the circular list, resetting all "recently used" bits until finding a block that has not been used since the last time the pointer reached this part of the circular list.

Maintenance of the block-referencing structure requires its updating for each and every block reference. In other words, the overhead of searching the stack, moving the referenced block to the top, and updating the rest of the stack accordingly must be added to all disk references. Similarly, the circular list must be maintained for each block accessed. As a result, cache designers oftentimes implement a pure LRU replacement strategy with extensive and dedicated hardware support for the described stack operations.

In view of these and other deficiencies associated with prior art methods of implementing a disk cache and replacement strategy, a continuing need exists in the art for new disk caching methods and structures, offering lower overhead and higher performance than is presently possible with known methods and systems.

SUMMARY OF THE INVENTION

Accordingly, it is an object of the present invention to provide a method and apparatus for the efficient software implementation and management of a disk cache system. The invention is implemented in a storage subsystem having, preferably, an array of selectively accessible direct access storage devices (disks), a processor, program memory, cache memory, and non-volatile memory and is responsive to commands received from at least one external source.

In response to the commands received from the external source, i.e., WRITE, READ, the storage system transfers data, preferably organized as blocks, to/from the direct access devices to/from the external source, as indicated. In order to speed access to the data, the blocks are held in an intermediary cache—when possible. Blocks which are the subject of a READ request and present in the cache, are transferred directly from the cache to the external source. Conversely, Blocks which are the subject of a READ request and are not present in the cache, are first transferred from the direct access devices to the cache. Finally, blocks which are the subject of a WRITE request are stored in the cache, and subsequently flushed to the direct access devices at a convenient time.

Viewed from one aspect, the present invention is directed to a method and apparatus for determining whether a particular block which is the subject of a READ request is present in the cache at a particular time. The method employs a hashing function which takes as its input a block number and outputs a hash index into a hash table of pointers. Each pointer in the hash table points to a doubly-linked list of headers, with each header having a bit map wherein the bits contained in the map identify whether a particular block of data is contained within the cache. Upon entry into the hash table, the linked headers are sequentially searched. If no header is found that contains the particular block, a cache "miss" occurs, at which point in time an available space is made within the cache to hold the block and the block is subsequently retrieved from the direct access device and stored within the cache. Conversely, if a header is encountered during the search of linked headers having a bitmap confirming that the particular block is a valid block, then a cache "hit" occurs and the block is transferred from the cache.

Viewed from another aspect, the present invention is directed to a method and apparatus for determining whether a particular block or group of blocks (cache line) that is contained within the cache is the best candidate (victim) for replacement by another block or set of blocks during a cache miss. Specifically, the method employs a heap (ordered binary tree) of candidates for replacement with the best candidate for replacement located at the root of the heap. The heap is sorted based upon a frequency of use and an age of each cache line, with the least-frequently-used and/or oldest cache line at the root of the heap.

The heap is modified in order to ensure that the most likely candidate (least-frequently-used/oldest) is always at the root of the heap. This is accomplished by performing a local reorganization of the heap every time a cache line is utilized. When a cache line is about to be accessed, i.e., data blocks will be read from or written into the cache line, the cache line is not removed from the heap. Instead, the cache line is marked as being in a busy state thereby preserving its position within the heap and ensuring that the data blocks within the cache line cannot be accessed by another READ or WRITE process simultaneously.

Upon completion of the access, the cache line is freed from its busy state and a frequency-of-use indicator and a timestamp—both associated with the cache line, are updated to reflect this access. Subsequently, a local reorganization (reheap) of the heap takes place beginning at a current location of the cache line in the heap. Upon completion of the reheap operation, the most likely candidate for replacement occupies the root of the heap.

Other features and advantages of the present invention will be appreciated by those skilled in the art upon reading the detailed description which follows.

BRIEF DESCRIPTION OF THE DRAWINGS

The teachings of the present invention can be readily understood by considering the following detailed description in conjunction with the accompanying drawings, in which.

DESCRIPTION OF THE PREFERRED EMBODIMENT

I will now describe the preferred embodiment of the invention while referring to the figures, several of which may be simultaneously referred to during the course of the following description.

Figure 1:
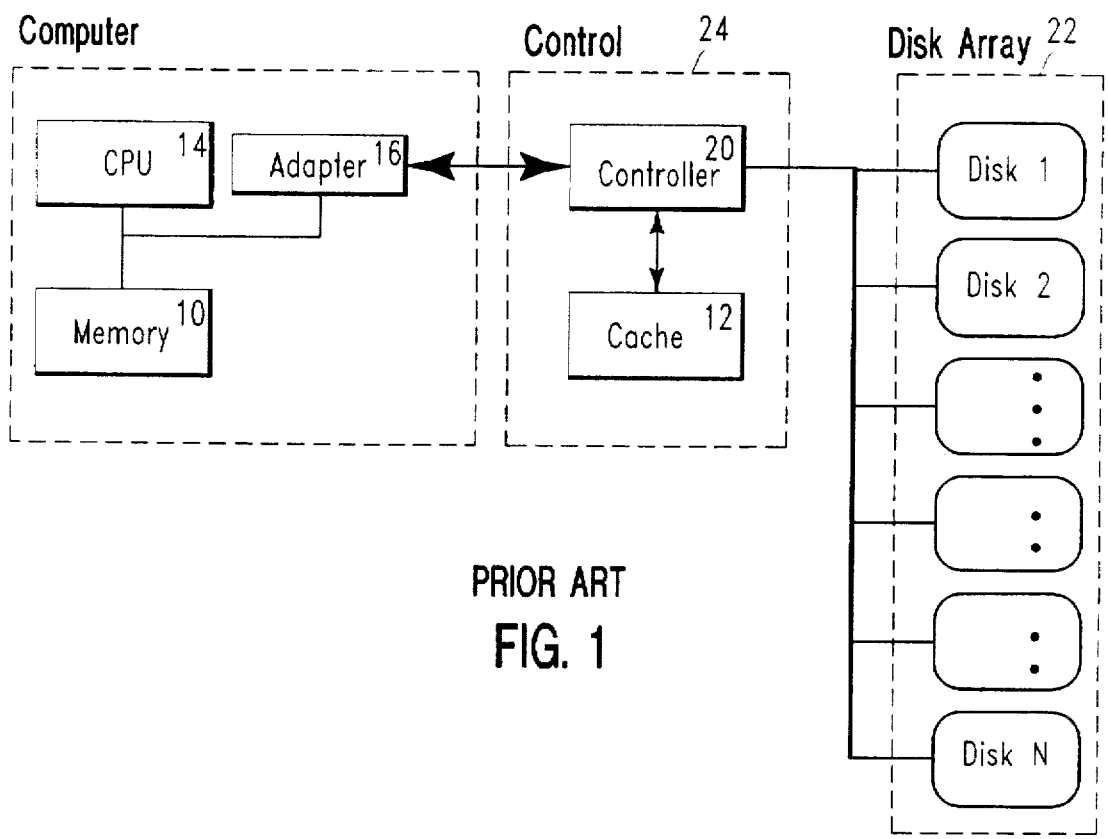
FIG. 1 is a block diagram showing a prior art system having a computer system in communication with a disk array system employing a cache.
Figure 2:
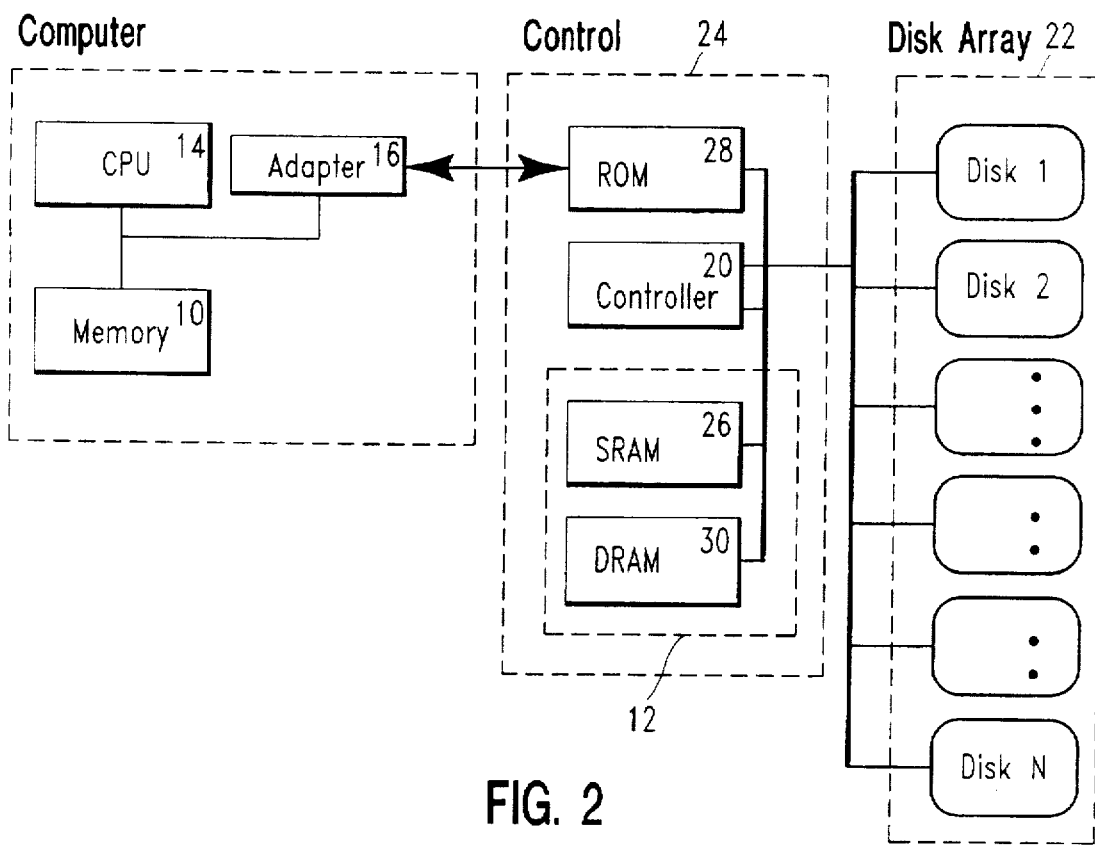
FIG. 2 is a block diagram illustrating a computer system in communication with a disk array system employing a cache in accordance with the present invention.

FIG. 2 shows a block level diagram of a disk cache system according to the teachings of the present invention. A computer system having a central processor (CPU) 14, main system memory 10, and host adapter are all interconnected by system bus 24. As shown, the computer system is interfaced via SCSI to a disk array system having one or more direct access storage devices (magnetic disks) organized as an array 22, through an array control unit 24, having array controller 20, controller read-only-memory (ROM) 28 and cache memory 12 preferably having static random access memory (SRAM) 26 and dynamic random access memory (DRAM) 30. Those skilled in the art can readily appreciate that array controller 20, is oftentimes implemented as a self-contained computer, i.e., having a CPU, memory and Input/Output components. In such a preferred embodiment, both SRAM 26 and DRAM 30 are used by the controller as cache memory. ROM 28 contains code and data necessary for the initial startup and initialization of array control unit 24.

Figure 3:
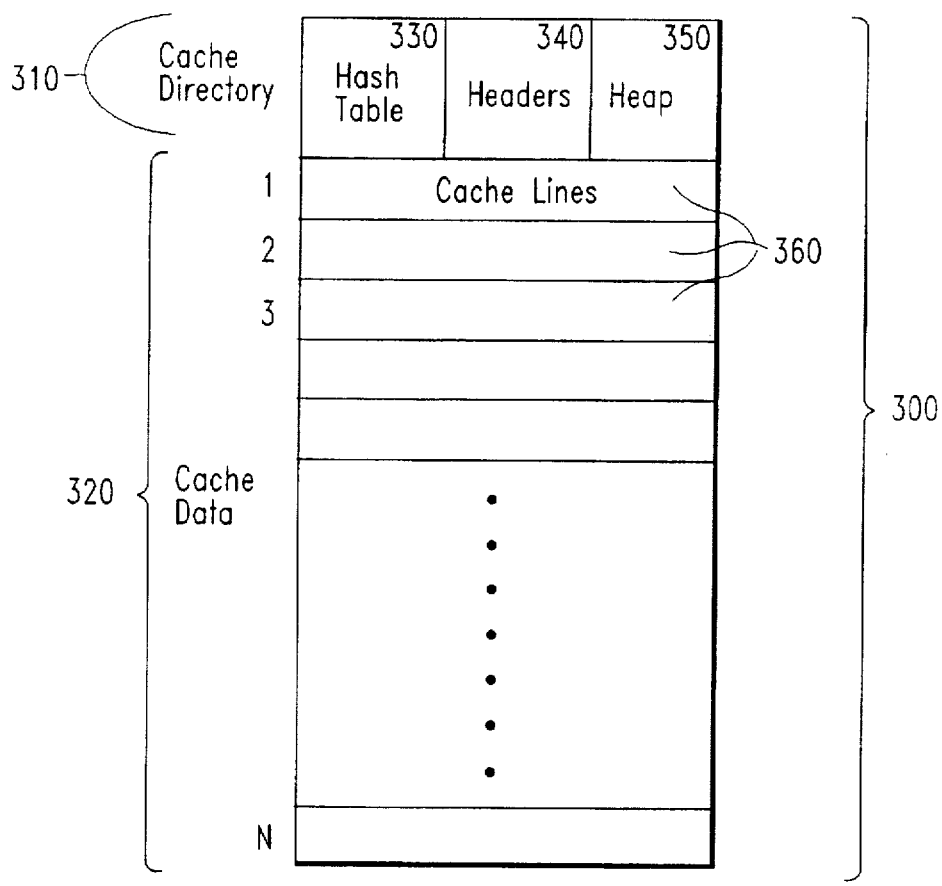
FIG. 3 is a diagram of the cache structure as used in the system shown in FIG. 2.

A cache incorporating the present invention may be handled by the structure shown in FIG. 3. Cache 300, which may be physically reside in either DRAM 30 or SRAM 26, consists of at least two distinct sections, a cache directory section 310 and a cache data section 320. The cache data section is further organized into a number of cache lines 360, which contain blocks of data which are transferred from/into disk array 22. The length of the cache lines are preferably user selectable, i.e., 16K, 32K, 64K. Regardless of the particular length selected for the cache lines, all cache lines within cache data section 320 will have the same length.

A. Determining Whether A Block is Contained Within the Cache

Cache directory 310, is used to manage the cache and in a preferred embodiment includes a hash table 330, headers 340, heap 350. Hash table 330, in conjunction with headers 340, is used to determine whether a particular block is contained within the cache at a given time. Heap 350, in conjunction with the headers, is used to identify a cache line that is a best candidate for replacement, when a cache miss occurs.

Figure 4:
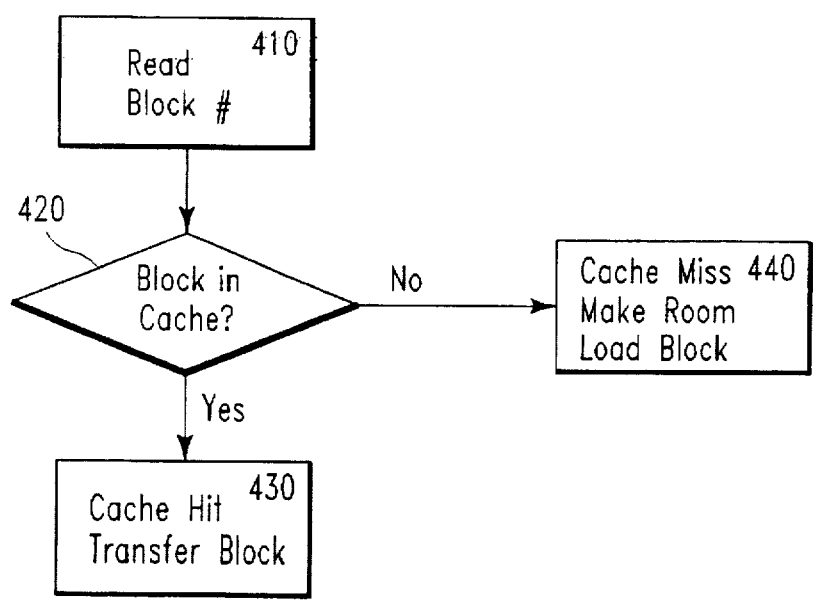
FIG. 4 is a flow chart depicting the steps associated with READing a block of data from disk array system employing a cache according to the present invention.

Referring now to FIG. 4, there is shown a flowchart which depicts the processing of a command, i.e., READ, by array control unit 26 when such a command is issued by host computer CPU 14. Specifically, a READ command having a particular block# as an argument is issued 410 and a determination is made 420, whether the particular block is presently contained within the cache. If the determination indicates that the block, which is the subject of the READ command is presently within the cache, then a cache hit occurs and the block is transferred from the cache to the host 430. Conversely, if the directory check indicates that the block is not within the cache, then block 440 is performed and the block is loaded from the direct access storage device 22 into the cache after a space of suitable size is made within the cache to hold the block.

Figures 4A, 4B:
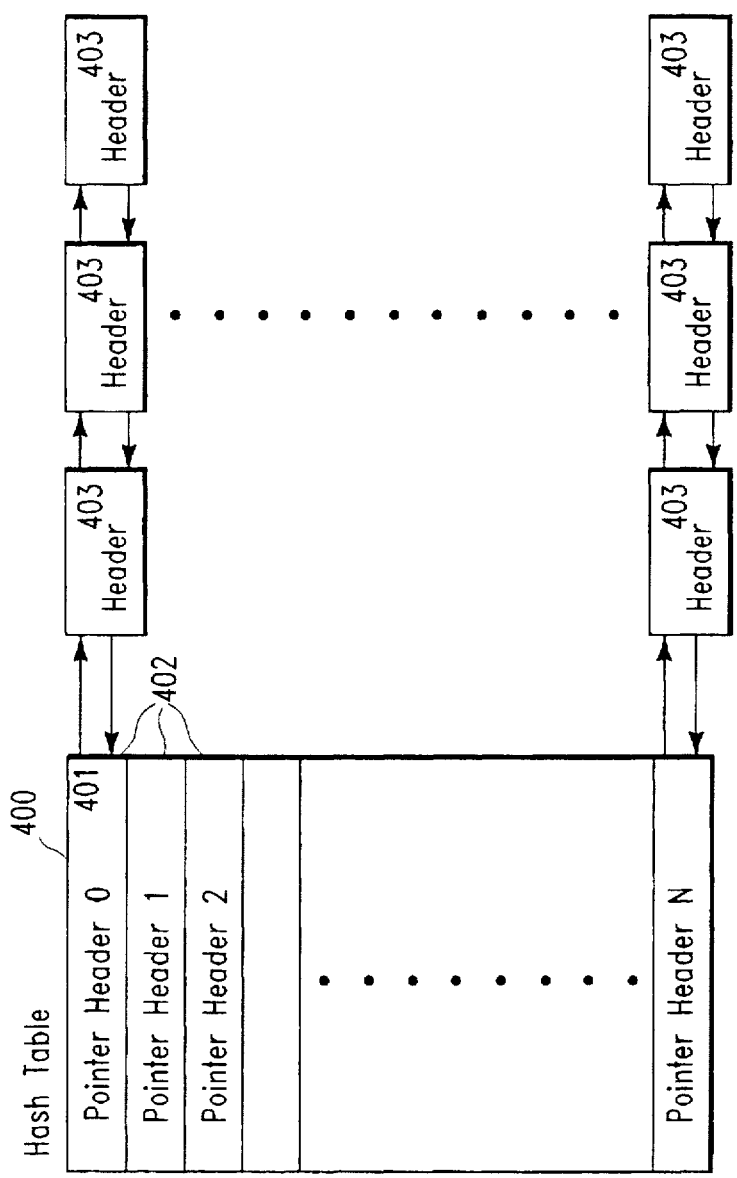
FIG. 4a is a diagram of a hash table and associated linked chains of headers.
FIG. 4b shows the members of a header used in the management of the cache.

The structures used in a preferred embodiment for determining whether a particular block is located in the cache is shown in FIG. 4a. A hash table (bucket table) 400, is an array of pointers 401, identified by their position in the table by an index, 402. Each pointer in the table points to a corresponding first header 403 in a doubly-linked chain of headers. Each of the headers have a one-to-one association with a particular cache line contained within the cache.

With further reference to FIG. 4b, each header in the linked chain contains a forward pointer 404, which points to a next header in the chain and a backward pointer 405 which points to a previous header in the list (or the hash table if the header is the first in the chain). Frequency member 406, identifies the number of times the particular cache line associated with the header has been accessed. Timestamp member 407, identifies a time at which the cache line was last accessed. ValidMap member 408, is a bit map, having one bit per block, that identifies whether a particular block is contained within a cache line.

DirtyMap member 409, is a bit map, having one bit per block, that identifies whether a particular block in the cache line is more recent, than a corresponding block in the direct access storage device. If the bit is set, then the block in the cache line is "dirty", that is, it has been modified and has not yet been written to the direct access storage device. This information is used by a corresponding intelligent flushing mechanism, which periodically checks for dirty blocks and if one is found, writes them to an appropriate direct access device.

Continuing with the description of the structure of header 403, status member 411 indicates whether the cache line is busy or free. Volume member 412, contains the identity of a volume, i.e., logical section of the disk array, to which the data contained within the cache line belongs. Address member 413, contains a block number of the first block contained within the cache line. Index member 414, contains an index into the heap for the cache line. Lastly, DataPtr member, is a pointer which identifies an address in the cache where the particular data in the cache line is located.

Figure 4C:
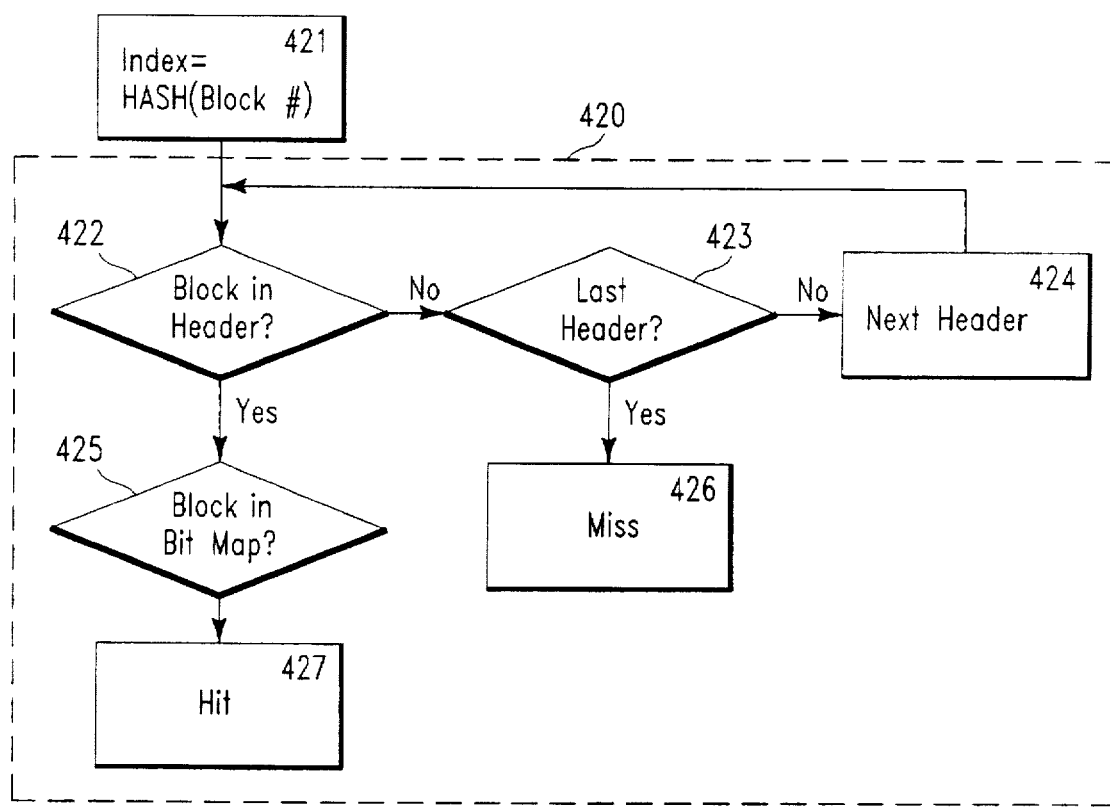
FIG. 4c is a flow chart depicting the steps associated with checking a directory to determine whether a particular block is located within the cache.

The steps performed in determining whether a particular block is located in the cache will be described with reference to the flow chart in FIG. 4c. At step 421, a block number that is the subject of the READ command is input to a hash function which produces as output an index into a hash table. Hash functions such as those which may be used in the present invention are well known in the art and therefore further description is not necessary. An important characteristic of any hash function which is used however, is that the hash function outputs only a single index.

The hash table (bucket table) is an array of pointers with each pointer pointing to a separate chain of linked headers. Step 422, using AddressMember 413, determines whether the block is managed by the current header. If the block is not managed by the current header, then another header is evaluated until there are no more headers in the chain 423. If all of the headers in a chain have been examined none manage the block, a cache miss has occurred 426.

If the block is managed by the header being examined, then a further examination of the ValidMap 408 is made to determine whether the block is presently within the cache. If the block is contained in the bitmap, then a cache hit has occurred 427. If not, a cache miss has occurred 426.

B. Determining Which Cache Line is the Best Candidate for Replacement

Figure 5A:
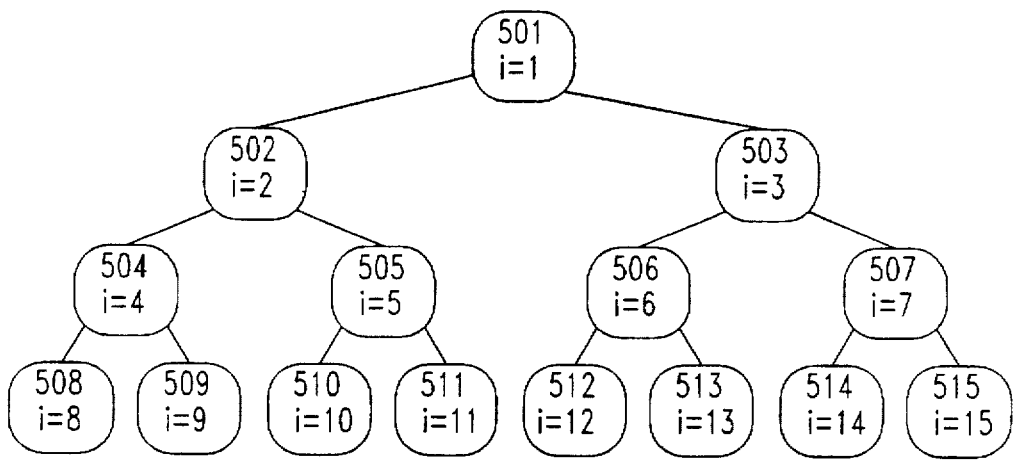
FIG. 5a is a diagram of a heap that is used to identify a cache line that is the most likely candidate for replacement after a cache miss.
Figure 5B:
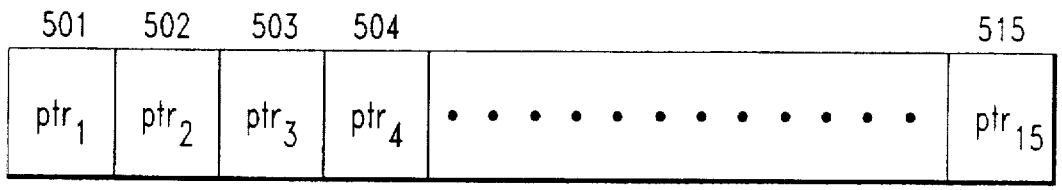
FIG. 5b is a diagram of the heap of FIG. 5a implemented implicitly as an array.

Cache line replacement may be determined through the use of a pair of related structures shown in FIGS. 5a and 5B, respectively. Those skilled in the art will recognize that FIG. 5a shows the structure of a heap, which is an ordered binary tree. According to our invention, a pointer to the header for the cache line which is the best choice for replacement is always located at the root of the heap.

The heap is preferably implemented as an implicit structure, an array, shown in FIG. 5b. With simultaneous reference to FIGS. 5a and 5b, there it can be seen that a one-to-one correspondence exists between nodes in the heap, and elements in the array. For example, the root of the heap 501, is the element at index position 1 (array[1])in the array and depicted by the same numeral, 501. The two children (left and right children) of root 501, shown in the heap as 502 and 503 respectively, are positioned in the array at array [2*i] and array [2*i+1]. Those skilled in the art can readily appreciate that any node within the heap can similarly be located within the array.

Each cache header contains information which is particularly relevant to the implementation of the replacement policy. As shown in FIG. 4b, the Frequency member 406 indicates how many times the particular cache line has been accessed since it was placed into the cache. The Timestamp member 407 indicates the time of the last access of the cache line. The position within the heap of the header pointer to a cache line is determined by its Frequency member 406 and its Timestamp member 407.

In accordance with the present invention, the replacement heap is modified to keep the best candidate for replacement at the root of the heap. This is accomplished by performing local reorganizations of the heap every time a cache line is utilized.

Accordingly, when a cache line is about to be used, that is, its data will be read or data will be written to it, its corresponding pointer contained within the heap is marked as busy by setting header Status 411. This ensures that the data contained within the cache line is not corrupted by another process. When the use of the cache line is completed, the header Frequency 406 is incremented by one, the Timestamp 407 is updated, and the Status 411 is cleared. Then, a local reorganization (reheap) of the heap takes place starting at the cache line's pointer location within the heap.

The reheap operation recursively takes a header pointer contained in the heap and "sinks it down" in the heap as a result of comparing the frequency with that of its children. If a child has a smaller frequency count than its parent, then a swap of the position of the parent and the child is required to maintain the heap's frequency-sorted order. In those situations where the parent and children have the same frequency, then their timestamps are evaluated and the header pointer that is the "oldest" becomes the new parent. Through the use of the local reorganizations, highly-efficient, low-overhead reheaps are realized.

Whenever a parent-child swap occurs based upon the timestamp, the oldest cache line involved in the swap will have its frequency count decreased to a value of the other cache line involved minus one. This ensures that the oldest cache lines bubble to the top of the heap more quickly since they are not being used frequently.

Every time a parent-child swap is performed, the parent "sinks" down a level and the child "bubbles" up a level. The effect of this operation is that the cache lines having the smallest frequency of use will be identified by the pointers positioned topmost of the heap.

Figure 6A:
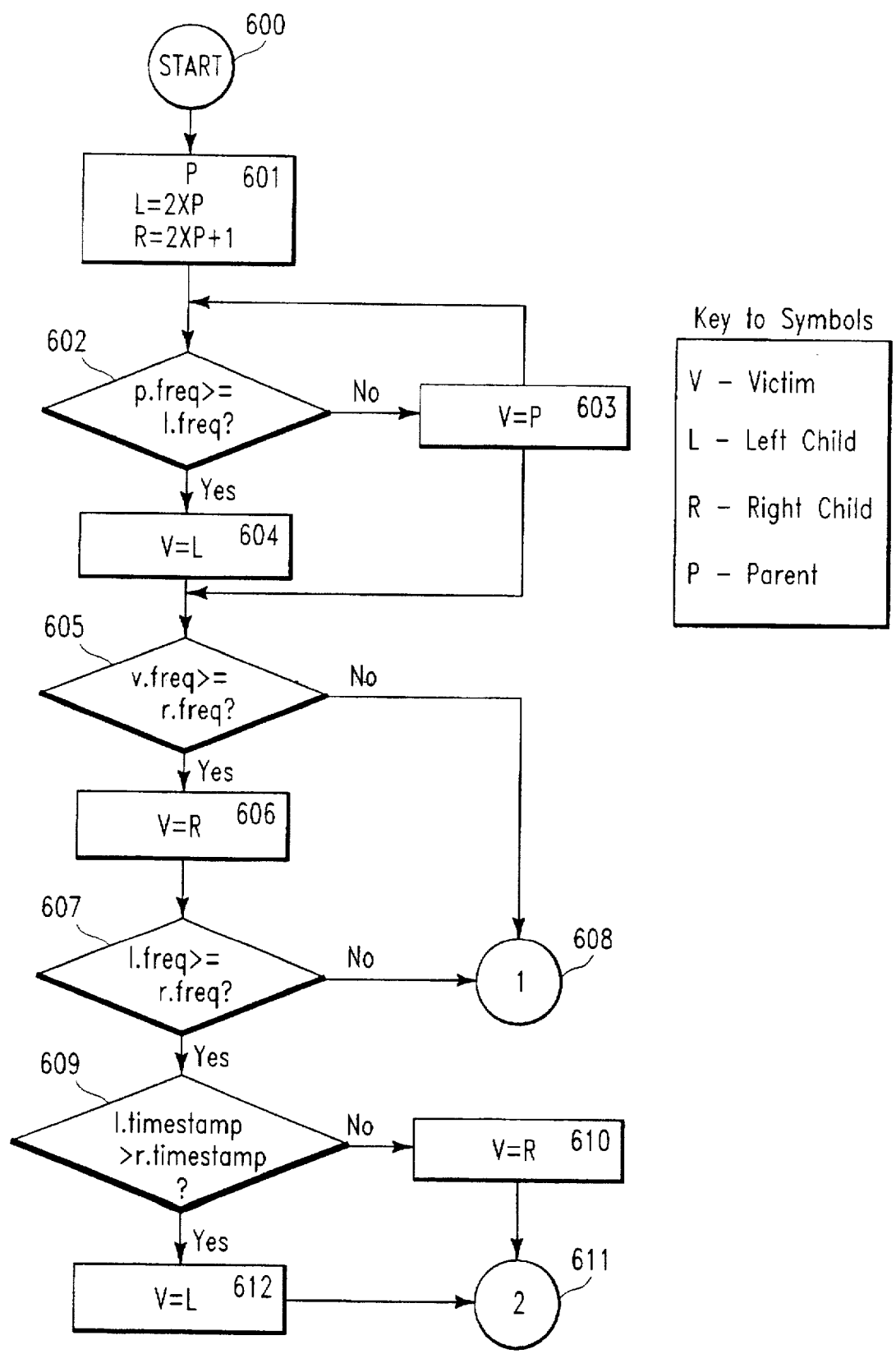
FIG. 6a is a flow chart depicting a portion of the steps associated with a reheap operation.

The steps performed according to the teachings of the present invention for a reheap operation will now be described with simultaneous reference to FIGS. 6a–6c. As indicated in the Key to Symbols shown in FIG. 6a, "V" designates a victim, that is a cache line which should be replaced; "L" designates a left child in the heap; "R" designates a right child in the heap and "P" designates a parent in the heap.

Entry to the reheap begins at Start 600 with a parent in the heap, and proceeds to process 601 where the left child and right child of the parent are identified in the array which implicitly describes the heap as discussed previously. A comparison is made between the parent frequency and the left child frequency at block 602 and if the parent frequency is greater than or equal to the left child frequency then the victim is identified as the left child 603 in block 604, else the victim is identified as the parent in block 603.

A comparison is then made at block 605 between the victim frequency and the right child frequency. If the victim frequency is less than the right child frequency, processing proceeds at block 608. If, on the other hand, the victim frequency is greater than or equal to the right child frequency then the victim is identified as the right child in block 606.

Subsequently, block 607 tests whether the left child frequency is equal to the right child frequency. If not, processing continues at block 608. Conversely, if the left child frequency is equal to the right child frequency, then a comparison is made between the left child timestamp and the right child timestamp at block 609. If the left child timestamp is less than the right child timestamp, the victim is identified as the left child in block 612 and processing proceeds with block 611. If, on the other hand, the left child timestamp is greater than or equal to the right child timestamp, the victim is identified as the right child in block 610 and processing proceeds to block 611.

Figure 6B:
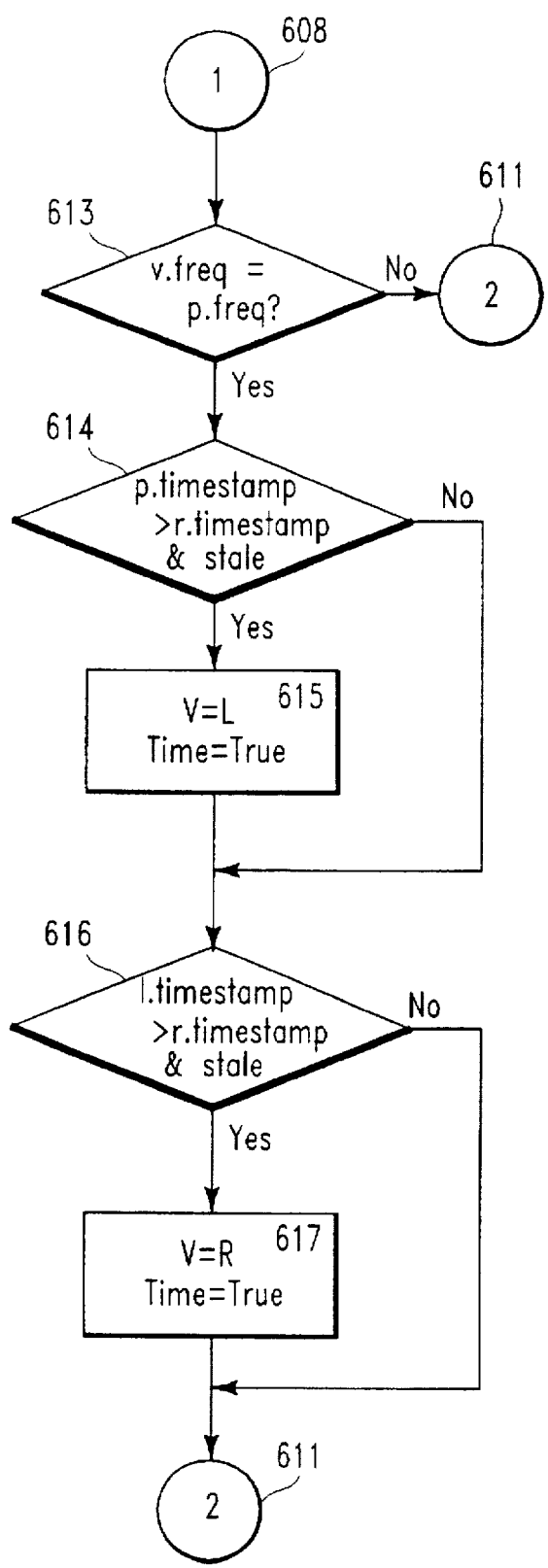
FIG. 6b is a flow chart depicting another portion of the steps associated with a reheap operation.

With reference now to FIG. 6b, showing entry 608, a comparison is made at block 613 to determine whether the victim frequency is equal to the parent frequency. If not, processing continues with block 611, else a determination is made in block 614 whether the parent timestamp is greater than the left timestamp plus a "stale" constant. The stale constant is preferably a user definable parameter which indicates an elapsed time after which a cache line becomes stale, that is, is not likely to be used again because it has not been used in a relatively long (stale) time. Advantageously, stale time values may be set over a wide range, i.e., a few milliseconds to several seconds, minutes, hours or even longer depending upon a particular application needs.

If the parent timestamp is greater than the left child timestamp plus the stale constant, then block 615 identifies the victim as the left child and sets a time variable as "TRUE", indicating that a stale cache line has been found. Processing then proceeds with a further determination in block 616 whether the victim timestamp is greater then the right child timestamp plus the stale constant. If not, processing proceeds at block 611. On the other hand, if the victim timestamp is greater than the right child timestamp plus the stale constant, then the victim is identified as the right child and the time variable is set to TRUE in block 617, prior to continued processing at block 611.

Figure 6C:
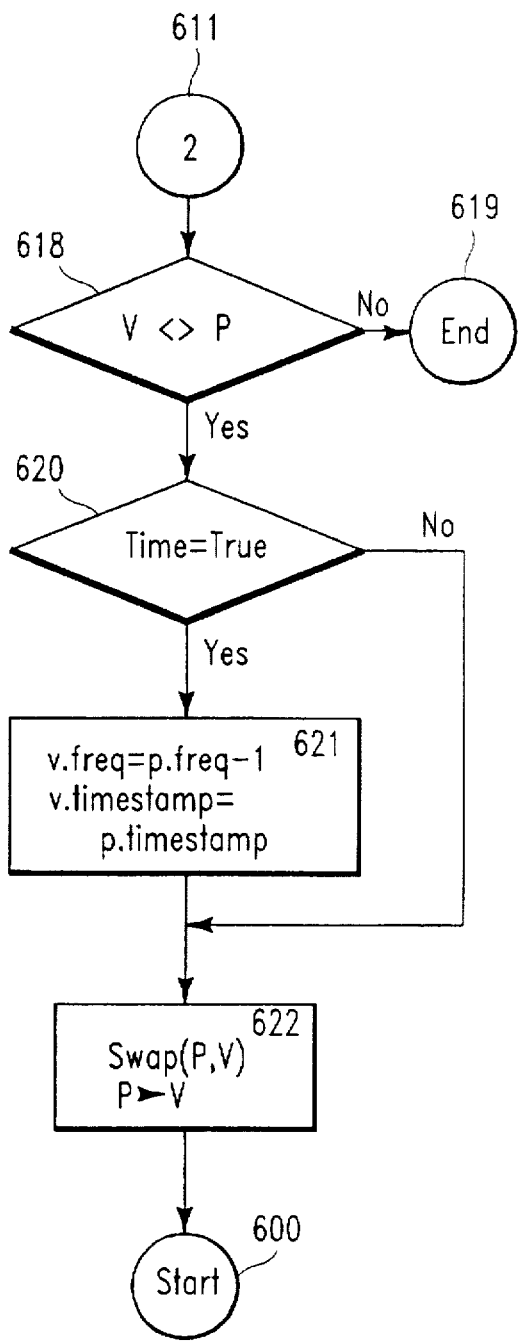
FIG. 6c is a flow chart depicting a final portion of the steps associated with a reheap operation.

With reference now to FIG. 6c, showing entry 611, a determination is made at block 618 by comparing the victim to the parent. If the victim is the parent (v=p) then processing ends at block 619 and the reheap is complete. Conversely, if the victim is not the parent, then a check is performed in block 620 to determine whether the time variable is set to TRUE. If the time variable is set TRUE, then block 621 updates victim frequency to parent frequency —1 and updates the victim timestamp to parent timestamp. Immediately thereafter, block 622 performs a swap operation on the parent and the victim (changing their positions in the heap) and identifies the parent as the victim. The entire process continues recursively, beginning again at block 600.

C. Concurrent Flushing of the Cache

While the methods and structures disclosed have been described in the context of determining a cache hit and identifying a best candidate for replacement during a cache miss, structures have been incorporated within the present invention which further enhance its performance and advances over the prior art.

Specifically and with further reference to FIG. 4b, the cache header 403 contains a bitmap, DirtyMap 409, which like bitmap, ValidMap 408, has a bit in the bitmap for each block of data contained within the cache line associated by the header. The bits contained in DirtyMap 409 identify those blocks of data which have been modified, i.e., new data has been written into them, and have not yet been written out "flushed" to the direct access storage devices. Such dirty block could pose a performance problem for a cache system because if such a block were part of a cache line identified as a most likely candidate for replacement, the entire cache line would have to be written to the direct access device BEFORE the cache line was replaced by new blocks, thereby degrading performance of the overall cache system.

The presence of the DirtyMap 409, however, permits a flushing daemon process to continuously operate, flushing dirty blocks to the direct access storage devices BEFORE the cache line in the block requires replacement. The daemon sequentially checks the headers identified by the array of pointers (implicit heap) until a first dirty cache line is found and flushed. In effect, this operation finds the first, dirty candidate for replacement and then flushes it.

Clearly, it should now be quite evident to those skilled in the art, that while my invention was shown and described in detail in the context of a preferred embodiment, and with various modifications thereto, a wide variety of other modifications can be made without departing from scope of my inventive teachings.

We claim:

1. An apparatus for managing a computer disk cache comprising:

means for determining, in response to a request from an external source to access a block of data, whether a block of data is contained within said computer disk cache;

means for ascertaining, in response to a cache miss, a best candidate for replacement wherein said ascertaining means includes:

a an ordered list of candidates for replacement wherein said ordered list is a heap having the best candidate for replacement at a top of the heap and wherein the order of the candidates for replacement is defined by a frequency-of-use of the candidate and an age of the candidate;

means for reordering the heap, subsequent to an access of a block of data, wherein said reordering means locally reorganizes the candidates contained within the heap; and means for continuously flushing a dirty block of data contained within the cache to a direct access storage device.

2. The apparatus according to claim 1 wherein said determining means comprises a hash table containing a plurality of pointers, and a plurality of doubly-linked lists of headers wherein each one of said plurality of pointers points to a corresponding doubly-linked list of said plurality of doubly-linked lists and each header identifies a corresponding block of data contained within the cache.

3. The apparatus according to claim 2 wherein said header comprises: a forward pointer, a backward pointer, a frequency member, a timestamp member, a ValidMap member, a DirtyMap member, a status member, a volume member, an address member, an index member and a data pointer.

4. The apparatus according to claim 3 wherein said ValidMap member is a bitmap containing a plurality of bits having a one-to-one correspondence with a plurality of data blocks contained within the cache and wherein one of said bits will indicate whether its corresponding data block is contained within the cache.

5. The apparatus according to claim 4 wherein said DirtyMap is a bitmap containing a plurality of bits having a one-to-one correspondence with said plurality of data blocks contained within the cache and wherein one of said bits will indicate whether its corresponding data block is contained within the cache.

6. In a computer disk storage system having one or more direct access storage devices, a cache and a cache controller, a method for computer disk cache management comprising the steps of:

determining, in response to a request received from an external source for a data block, whether said data block is contained within the cache by:

producing an index into an array of pointers by hashing an identifier of said data block;

traversing a doubly-linked list of headers pointed to by a pointer, said pointer being located in said array of pointers at an index position, and wherein each of said headers contains a valid indicator which indicates the presence of said block in the cache and a dirty indicator which indicates whether said block in the cache has been modified; and examining the indicator in each of said headers in the doubly-linked list until said block has been located or each of said headers has been examined;

identifying, in the event of a cache miss, a victim cache line in the cache for replacement by:

selecting a best victim from a heap having a plurality of nodes wherein each node identifies a possible victims and wherein said best victim is indicated by a first entry in the heap;

reordering the heap after accessing a block in the cache, by performing a local reorganization such that the heap is in least-frequently-used order further subject to an age rule; and periodically checking the dirty indicator contained in the headers and flushing a cache line containing a dirty block to the direct access storage device.

7. The method according to claim 6 wherein said heap is implicitly implemented as an indexed array of elements, wherein a one-to-one correspondence exists between a single element in the array and a single node in the heap.

8. The method according to claim 7 wherein said valid indicator is a bitmap containing a plurality of bits having a one-to-one correspondence with a plurality of data blocks contained within the cache and wherein one of said bits will indicate whether its corresponding data block is contained within the cache.

9. The method according to claim 8 wherein said dirty indicator is a bitmap containing a plurality of bits having a one-to-one correspondence with said plurality of data blocks contained within the cache and wherein one of said bits will indicate whether its corresponding data block is contained within the cache.

10. The method according to claim 9 wherein said index producing step comprises:

hashing a data block number with a hash function such that an index into a hash table is produced.

* * * * *